Dec. 28, 1948.  Y. A. BOUGET  2,457,636
MATERIAL SERVING APPARATUS
Filed Dec. 31, 1947  4 Sheets-Sheet 1

INVENTOR
Y. A. BOUGET
BY
ATTORNEY

Dec. 28, 1948.   Y. A. BOUGET   2,457,636
MATERIAL SERVING APPARATUS
Filed Dec. 31, 1947   4 Sheets-Sheet 2
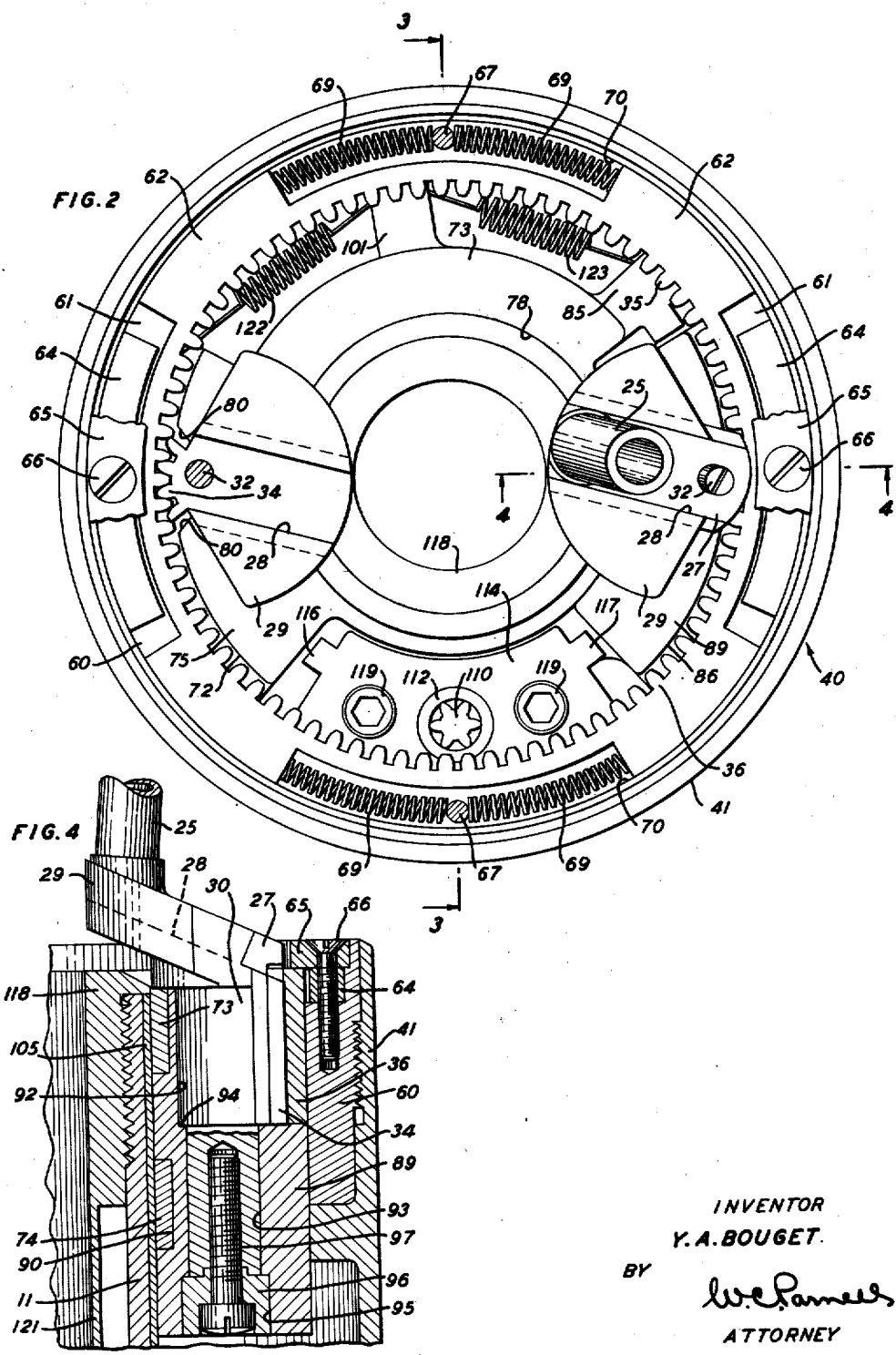
INVENTOR
Y. A. BOUGET.
BY
w.c.Parnell
ATTORNEY

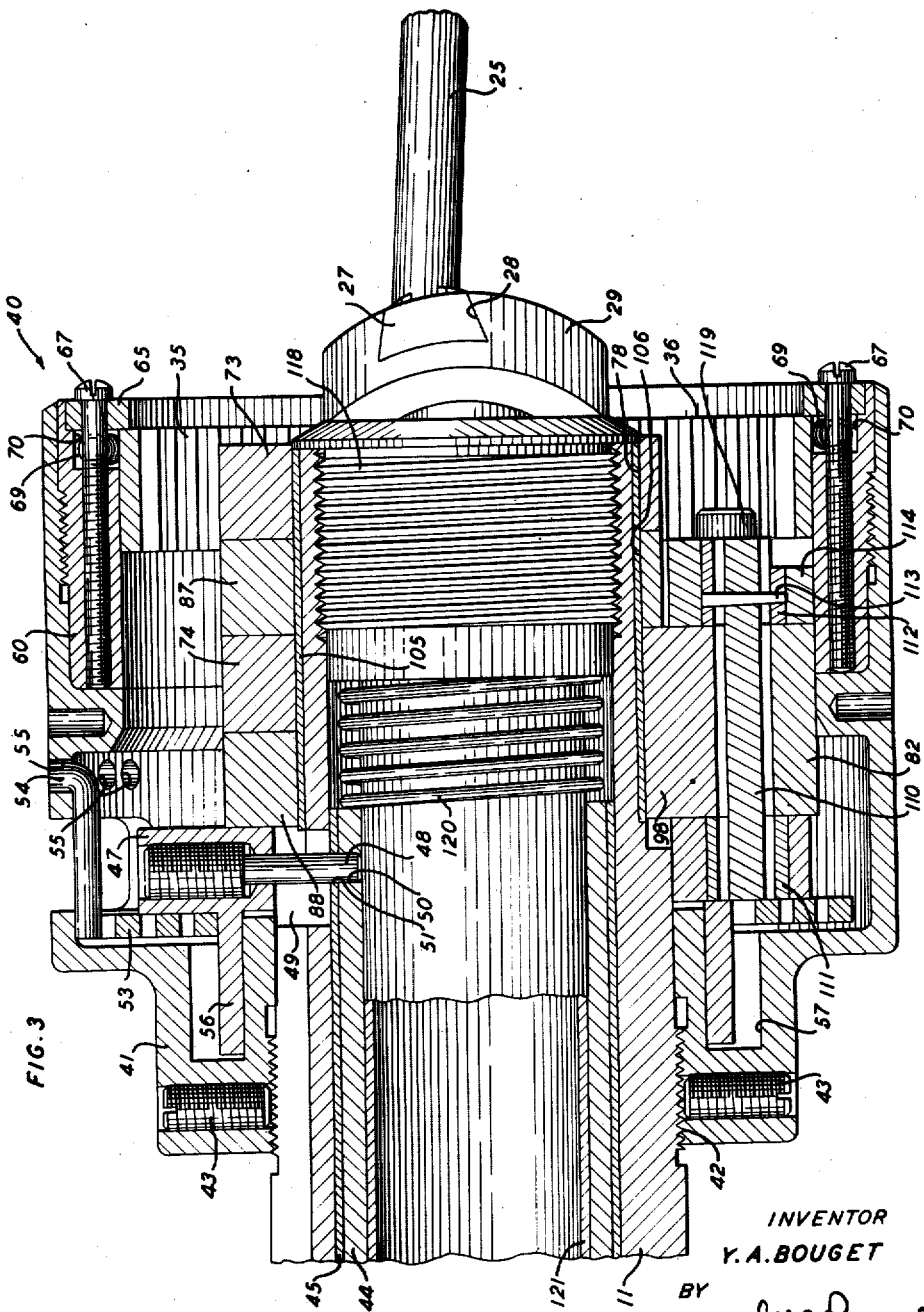

Dec. 28, 1948.                    Y. A. BOUGET                    2,457,636
                            MATERIAL SERVING APPARATUS
Filed Dec. 31, 1947                                              4 Sheets-Sheet 4
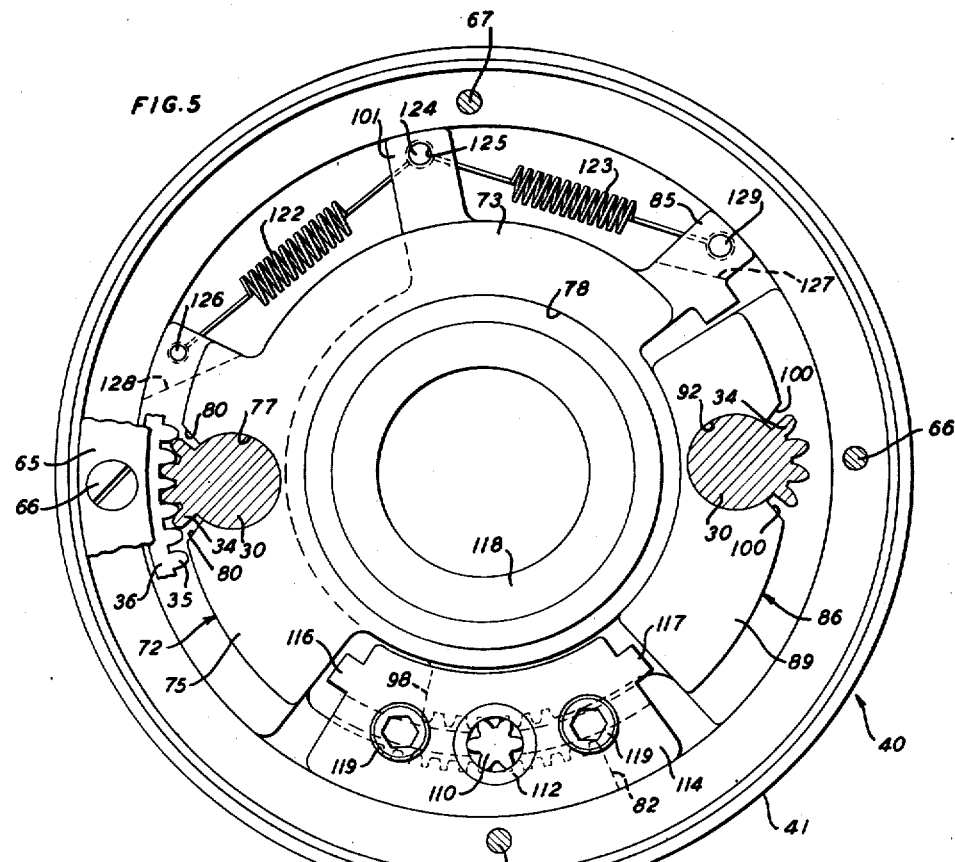
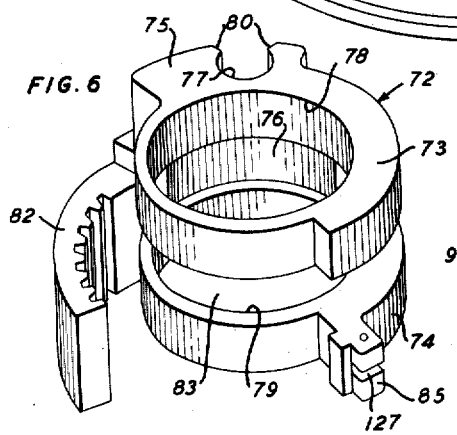
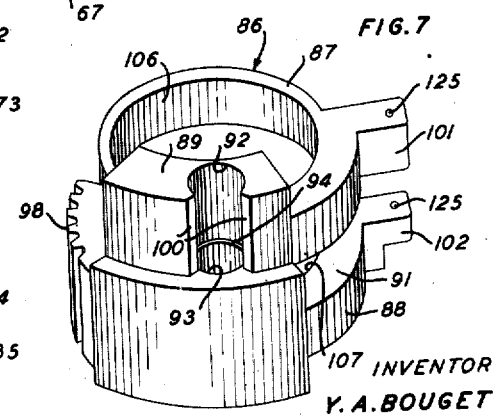
INVENTOR
Y. A. BOUGET
BY
W. E. Parnell
ATTORNEY Patented Dec. 28, 1948

2,457,636

UNITED STATES PATENT OFFICE 2,457,636

MATERIAL SERVING APPARATUS

Yves A. Bouget, West Orange, N. J., assignor to Western Electric Company, Incorporated, New York, N. Y., a corporation of New York Application December 31, 1947, Serial No. 794,966

11 Claims. (Cl. 57—16)

This invention relates to material serving apparatus, and more particularly to a material tension equalizer which is a member in part and the actuating means for tension controlling mechanism of the material serving apparatus disclosed in applicant's copending application, Serial No. 711,975, filed November 23, 1946.

During the manufacture of certain electrical cables, layers of paper tape are spirally wrapped on the cable core during longitudinal advancement of the core. One of the important factors in producing uniform cable structures is the laying of the paper tapes evenly upon the cable core. To produce this result, uniform tension in the tape is essential, but conditions arise which frequently unbalance the tensions in the tapes, particularly when two or more tapes are served simultaneously in superimposed layers on the cable core. When the tensions become unbalanced they must be reequalized immediately if a uniform lay of tapes on the core is to be maintained.

An object of the invention is to provide a material serving apparatus which is highly efficient in equalizing the tensions in materials served simultaneously to an advancing core, and varying the angles of lay of the materials on the core with variations in their tensions to cause uniform lay of the materials on the core.

With this and other objects in view, the invention comprises an apparatus for serving to an advancing core supplies of material to be wound spirally in superimposed layers on the core. Such a serving operation requires relative rotation between the serving apparatus and the core. In most cable manufacturing operations the core advances without rotation and it therefore is necessary to rotate the serving apparatus around the core. It will be understood, however, that the principles of the invention may be embodied in stationary apparatus cooperating with a rotating core or in a system in which both the apparatus and the core rotate to provide the required relative speed of rotation. In the present embodiment of the invention, the apparatus is rotated about the advancing core. Material guiding fingers are supported for rocking motion in the units to vary the angular lay of the materials on the core. The units are controlled by varying tensions in materials passing around the fingers from their supplies to the advancing core to cause the units to move relative to each other to equalize the tensions in the materials.

More specifically, the immediate supports for the fingers include gear segments interengaging a ring gear whereby variation in the tension of either material from a predetermined tension will cause the supports to rock the fingers to vary the angle of application of the material on the core. The units for the fingers are operatively connected to each other whereby variation of the tension in one material from the predetermined standard, resulting in a rocking motion imparted to that unit, will cause, through the connecting mechanism, a like rocking motion to the other unit to equalize the tensions in the materials. The tension control mechanism which is not a part of this application, but is a part of the aforementioned copending application, functions with the tension equalizing mechanism of this apparatus to form a complete control for the materials served to the advancing core.

Other objects and advantages will be apparent from the following detailed description when considered in conjunction with the accompanying drawings, wherein Fig. 1 is a side elevational view of the apparatus shown in combination with the tension control apparatus which is the subject matter of applicant's aforementioned copending application;

Fig. 2 is an enlarged end elevational view of the apparatus, portions thereof being removed to show certain of the inner structures of the apparatus;

Fig. 3 is a fragmentary sectional view taken along the line 3—3 of Fig. 2;

Fig. 4 is a fragmentary sectional view taken along the line 4—4 of Fig. 2;

Fig. 5 is a vertical sectional view taken a short distance back of the structure shown in Fig. 2; and Figs. 6 and 7 are isometric views of the main portions of the units supporting the actuating fingers.

Figure 1:
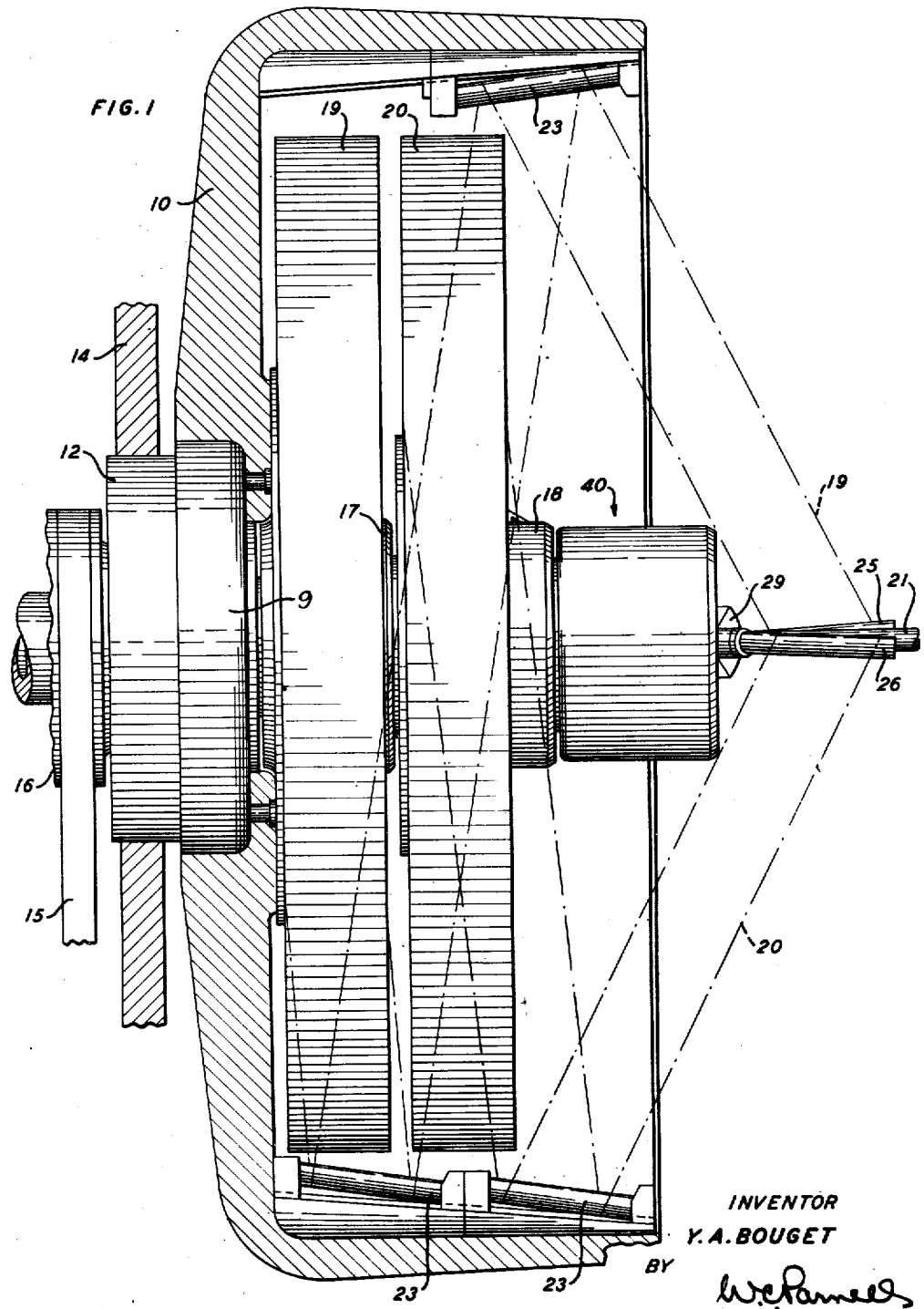

Referring now to the drawings, attention is first directed to Fig. 1 which shows the apparatus including a housing 10 supported on a flanged portion 9 of a hollow spindle 11 one end of which is mounted for rotation in a bearing 12 in a stationary frame 14. The spindle 11 is rotated from a suitable driving means through a belt 15 and pulley 16. Units 17 and 18 compose the material tension control mechanism of applicant's aforementioned copending application and are included in this structure as rotatable supports for supplies of material 19 and 20, such as paper tape, to be served spirally on an advancing core 21. The tapes of material 19 and 20 are drawn from their supplies and pass over suitable guiding means, including pins or rollers 23 supported by the housing 10, in their travel toward the core 21. Before reaching the core 21, the tapes pass around guide or applicator fingers 25 and 26. The guide fingers are in the form of metal tubes having their inner ends fixed to bases 27, the bases being identical in structure and of dovetail formation to be received in dovetail slots 28 in heads 29 of their respective supports 30 (Fig. 4). The heads 29 are mounted at like angles on their respective supports 30 and the fingers 25 may be selected from a plurality of sets of different lengths mounted at varied angular positions with respect to their bases, depending upon the widths of the paper tapes and the diameter of the core on which they are to be served. The dovetail connection between the bases 27 and the heads 29 form the major connecting means between the guide fingers 25 and their supports 30, the bases being secured in place in their holders by screws 32. The supports 30 have gear segments 34 formed on the upper portions thereof to interengage teeth 35 of a ring gear 36.

The spindle 11 supporting the housing 10 (Fig. 1), in addition to the portion extending to the left through the bearing 12 and the pulley 16, has a main portion extending to the right through the units 17 and 18 and substantially through the main unit 40 of this apparatus. A housing 41 is mounted on a threaded portion 42 of the spindle 11 and secured thereto by set screws 43. A tubular cam 44, which functions as a part of the tension control means of applicant's aforementioned copending application, is slidably disposed in the spindle, a bronze sleeve 45 being disposed concentric with the tubular cam member 44 and secured thereto. An annular element 47 disposed concentric with the spindle 11 for movement axially thereof a limited distance carries three threaded pins 48, only one of which is shown in Fig. 3 of the drawings, which extend through elongate openings 49 in the spindle and have their inner ends disposed in apertures 50 of the tubular cam 44 and 51 of the bronze sleeve 45. A helical spring 53 disposed on the element 47 has its inner end secured to the element in a suitable manner (not shown) its outer end 54 being positioned in any selected one of a plurality of apertures 55 in the housing 41. The purpose of the spring and the varying features provided through the existence of the apertures 55 is to create a selected variable tension in the tape materials 19 and 20. A sleeve-like portion 56 of the element 47 extends into an annular recess 57 of the housing 41.

An annular member 60 is threadedly disposed in the outer portion of the housing and has cut-away portions 61 therein to receive radially extending members 62 of the ring gear 36. Diametrically opposed projections 64 of the annular member 60 are interposed between two pairs of the projections 62 of the ring gear, the projections 64 being shorter in length than the arcuate space or recess between the members 62 whereby the ring gear may be rocked a given distance in either direction from its normal position. A retaining ring 65 is positioned over the ring gear 36 and is secured to the projections 64 of the annular member 60, by the aid of screws 66 and 67. The screws 67 are interposed between pairs of springs 69 which are disposed in recesses 70 of the member 60 and function to normally hold the ring gear 36 in a given position. It will be noted that the springs 69 are positioned between pairs of the members 62 of the ring gear 36 at diametrically opposed positions, the outer ends of the springs engaging their adjacent projections 62.

Attention is now directed to the units shown in Figs. 6 and 7 for supporting the guide fingers 25 and their respective supporting structures. The unit shown in Fig. 6 and identified by reference numeral 72 is formed of one piece of material including substantially annular members 73 and 74 separated from each other for the major portion of their circumferential distances and disposed parallel with each other. A portion 75 of the unit 72 is solid for the full thickness of the unit, its inner surface being provided with an annular recess 76 disposed between the annular members 73 and 74. An aperture 77 is formed in the portion 75 extending completely through the portion and positioned parallel with the centerlines of aligned apertures 78 and 79 in the annular members 73 and 74. The aperture 77 is partially cut away at 80 for the thickness of the member 73 to allow for the gear segment or toothed portion 34 of its respective support 30. A gear quadrant or toothed member 82 integral with the portion 75 extends a distance about the annular member 74 and the space 83 between the members 73 and 74. A radially extending member 85 is integral with the member 74.

The unit 86 shown in Fig. 7 is similar in contour to the unit 72 in that it is provided with substantially annular members 87 and 88 disposed parallel with each other and spaced a given distance apart whereby they may be disposed in interfitting relation with the annular members 73 and 74. The unit 86 is also formed of one piece of material, the connecting member 89 being recessed on its inner surface 90 (Fig. 4) similar to the recesses 76 at a position adjacent the space 81 between the annular members 87 and 88. An aperture 92, similar to the aperture 77 of the unit 72 extends the full length of the portion 89 to receive its respective support 30 for its guide fingers 25. In actual structure as illustrated in Figs. 4 and 7, the upper portions of the apertures 77 and 92 are larger than the intermediate portion indicated at 93 providing a shoulder 94 for the upper portion of the support 30 to rest upon in each instance. The lower portions of the apertures 77 and 92 are substantially equal in diameter to their larger upper portions as indicated at 95 (Fig. 4) to receive the retaining members 96 held in place by screws 97, extending into the supports 30 to secure them in place and to permit rocking motion thereof in their respective units 72 and 86. The member 89 of the unit 86 has a gear quadrant or toothed portion 98 which in assembly is positioned adjacent, but in a given spaced relation to the quadrant 82 as shown in Fig. 5. The upper portion of the aperture 92 of the unit 86 is cut away as at 100 to allow for the toothed portion 34 of its respective support 30. The annular members 87 and 88 have outwardly projecting portions 101 and 102 for a purpose hereinafter described.

The units 72 and 86 are initially assembled with their axes coincident with each other, the annular member 87 of the unit 86 being disposed in the space 83 and the recess 76 between the annular portions 73 and 74 of the unit 72 and the annular member 74 disposed in the space 91 and recess 90 between the annular members 87 and 88 of the unit 86. When in the assembled position, a bronze bushing 105 (Fig. 3) is inserted in the apertures 78 and 79 of the unit 72 and the like apertures 106 and 107 of the annular members 87 and 88 of the unit 86. The supports 30 for the guide fingers 25 are assembled in their respective apertures 77 and 82 and with the addition of springs hereinafter described, the assembled units are placed on the reduced end of the spindle 71, the bushing 105 closely fitting the reduced end of the spindle. The ring gear 35 is mounted in position intermeshing the teeth 34 of the supports 30 whereby the heads 29 will be located in their normal positions by the balancing actions of the springs 69 on the ring gear.

A pinion 110 in the form of a toothed rod is positioned between the quadrants 82 and 88 of the units 72 and 86 as shown in Figs. 2, 3, and 5 to operatively connect the units 72 and 87 by interengaging the teeth of the quadrants. The innermost or left end of the pinion 110 is held at a fixed position by a bushing 111, but free to rotate therein, the bushing being mounted in the annular element 47. The opposite end of the pinion 110 is mounted in a similar bushing 112 and secured thereto by a pin 113, the bushing 112 being rotatably disposed in an aperature of a retaining member 114. The retaining member 114 is arcuate in general contour and provided with projections 116 and 117 to serve as stops to limit relative movement of the units 72 and 86. Mounting screws 118 extend through apertures in the retaining member 114 and through the space between the quadrants 82 and 88 where their threaded inner ends enter threaded apertures (not shown) in the annular element 47, thus making the retaining element 114 a fixed part of the annular element 47 and, by being positioned adjacent the quadrants 82 and 88 allowing relative movement of the units 72 and 86 yet holding them against axial movement relative to the annular element 47.

The outer reduced end of the spindle 11 is internally threaded to receive a tubular externally threaded member 118, the inner portion 121 of which is reduced in outer diameter to extend through the cam element 44 to guide a core 21, such as a cable structure, formed of insulated electrical conductors through the unit between the guide fingers 25. A spring 120 disposed concentric with the reduced portion 121 and abutting the inner portion of the member 118 also engages the outer end of the tubular cam 44 to normally hold it in a given position, this spring being compressible by movement of the units 72 and 86 to the right caused by increased tension on the tape material creating pull to the right on the fingers 25 to eventually move the annular element 47 to the right and through the pins 46, move the cam 44 against the force of the spring 120.

The units 72 and 86 are connected by springs 122 and 123 as illustrated in Fig. 5. Both springs have their inner ends connected to a pin 124 extending through aligned apertures 125 of the projections 101 and 102 of the unit 86. The portion 76 of the unit 72 has a groove 126 formed therein to receive the adjacent end of the spring 122 which is secured to a pin 126 extending through the groove 126 and supported in an aperture in the member 76. The outer end of the spring 123 extends into a slot 127 of the projection 88 of the unit 72 where it is connected to a pin 128.

In preparing the apparatus for operation, supplies or pads of tape material 19 and 20 are mounted on their respective units 11 and 18, the tape materials threaded over their respective guiding means such as the rollers or guide pins 23 and around their respective applicator fingers 25 to the core 21. Owing to the fact that one tape will lie adjacent the core, the other tape lying upon the first tape, the first tape is initially threaded through the apparatus and secured in any conventional manner to the core, after which the second tape is threaded through the apparatus and in a similar manner and secured to the core in its position over the first tape.

The apparatus is now in readiness for operation which includes rotation of the apparatus in a given direction during simultaneous advancement of the core 21 at a constant rate of speed. One of the functions of the ring gear 35 in conjunction with the units 72 and 86 when the apparatus starts to rotate is to cushion the initial pull on the tapes through the springs 69. Any jerking action on the tapes, one of which may be tighter than the other as the initial tension created in the tapes is under the control of the operator in threading the tapes through the apparatus and connecting their leading ends to the core, may cause the tape with the greatest tension therein to break. Should one of the tapes be under a greater tension than the other tape during the starting of the apparatus and the initial advancement of the core, the greater pull on the applicator finger 25 of that tape will cause it to partially rotate its unit 72 or 86, rotating also the ring gear 35 against the forces of certain of the springs 69. This condition is overcome, however, almost as soon as it occurs by the inherent forces of the spring 69 tending to return the units to their normal positions. If, however, the condition exists wherein there is a counterbalance in the tension of the tapes, the tape with greater tension will create a pull on its guide finger 25 causing rotation of its unit about the spindle 11 in the direction of the pull of the tape.

As a matter of illustration, let it be assumed that excess tension is present in the tape 20 causing rotation of the unit 86 a given distance in a clockwise direction, causing its quadrant 88 to rotate the pinion 110 in a counterclockwise direction to move the quadrant 82 with the unit 72 in a counterclockwise direction, a distance equal to the distance the unit 86 has been moved in the opposite direction. As a result of the relative rotary movements of the units 72 and 86, the tension in the tape 19 has been increased to the tension in the tape 20. At the same time, during these rotary movements of units 72 and 86 relative to the ring gear 35, the supports 30 interengaging the ring gear through their teeth 34 have been caused to rock in directions opposite the directions of movements of their units to vary the angular positions of their applicator fingers 25 with respect to the advancing core 21.

When the units 72 and 86 are in their normal positions, the applicator fingers are disposed at like angles with respect to the advancing core upon opposite sides thereof to cause their respective tapes to be served uniformly to the core during rotation of the core at a given speed during rotation of the apparatus at a given speed and with a predetermined tension in both tapes. When the tension in either or both tapes increases beyond the predetermined or desired tension, the tapes are in effect being served to the core at a slower rate of speed than desired and, to cause them to lie uniformly on the core and completely cover the core with their spiral wrappings, the angular positions of the applicator fingers must be varied to decrease the number of convolutions of the tape material per foot on the core. On the other hand, should either or both tapes become slack or have tensions therein lower than the required tensions, it is important that for a given interval of time, a greater number of convolutions of the slackened tape or tapes be wound on the core until the given tension has again been created in the slackened tape or tapes.

The additional function of the ring gear 36 and its association with the supports 30 for the fingers 25 is to vary the angular positions of the fingers with respect to the path of advancement of the core 21 to accomplish the result of varying the lay of the tapes on the core to compensate for variations in the tensions of the tapes. It should be borne in mind that the existence of excess tension in one tape resulting in the actuation of the units 72 and 86 to equalizing the tensions in both tapes, results in the existence of excess tension in both tapes at certain times during the operation of the apparatus. During these times, the constant pull on the tapes at the position of application of the tapes to the core results in excess pull in the direction of movement of the core to cause the tapes to move the fingers 25 to the right (Fig. 3). This pull is translated through their supports 30, their units 72 and 86 which are connected to the annular element 47 by the screws 119 causing movement (Fig. 3) of the annular member to the right, and with it, the pins 48 and the tubular cam 44. The tubular cam 44 extends into the units 17 and 18 where it causes actuation of the tension control means disclosed in applicant's aforementioned copending application.

The functions of the springs 122 and 123 are to return their units 72 and 86 to their normal positions when the tensions in the tapes have been reduced to that desired. These springs also function to cause relative movement of the units when either tape becomes slack. In this instance the unit associated with the slack tape is caused to rotate by the force initially embodied in the springs 122 and 123. For example, let it be assumed that the tape 19 has become slack allowing the force embodied in the springs 122 and 123 to cause the unit 72 to be moved clockwise (Fig. 5) causing its quadrant 82 to rotate the pinion 110 to cause like rotation of the unit 86 in a counter-clockwise direction to reduce the tension in the tape 20 until the tensions in both tapes have been equalized. During this action, the supports 30 for their respective applicator fingers 25 will be rocked, due to the interengagement of the teeth 34 with the ring gear 36 to vary the angular relation of each applicator finger with respect to the path of the advancing core. A decrease in the tension of both tapes will allow the force created in the helical spring 53 to rotate the annular element 47 to cause actuation of the cam 44 to assist in controlling the tensioning means to return the tension in each tape to that desired.

The ratio of the distance between the axis of each support 30 and the line of engagement between its teeth 34 and the ring gear 36 and the distance between the said axis and the center-line of the finger 25, is approximately one to three, whereby this mechanism is sensitive to tension variations in the tapes and will respond rapidly thereto to maintain uniform lay of the tapes on the core.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, fingers disposed adjacent the path of the core to guide their respective materials to the core, rockable supports for the guide fingers normally holding the fingers at given angular positions with respect to the path of the core to cause application of each material under a given tension at a given angular position on the core, and means responsive to variations in the tensions of the materials from the given tension to rock the supports to vary the angles of application of the materials to the core to cause uniform lay of the materials on the core.

2. In a material serving apparatus rotatable about a core, advancing longitudinally at a given rate of speed, to wind materials simultaneously in superimposed spirals layers on the core, a rotatable hollow spindle through which the core travels, supports carried thereby for supplies of materials fed to the core, units mounted on the spindle for rotation therewith and for relative rocking motion thereon, means to normally hold the units in given relative positions on the spindle, fingers for the units disposed adjacent the path of the core to guide their respective materials to the core, supports for the guide fingers mounted for rocking movement in their units and normally holding their fingers at given angular positions with respect to the core to cause application of each material under a given tension at a given angular position on the core, variations in the tensions of the materials causing rocking movement of their respective units on the spindle, and means to rock the finger supports when their units have been rocked on the spindle by variation in the tensions in the material from the given tension to vary the angles of application of the materials to the core to cause uniform lay of the materials on the core.

3. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, means to normally hold the units in given relative positions on the spindle, fingers for the units disposed adjacent the path of the core to guide their respective materials to the core, supports for the guide fingers mounted for rocking movement in their units and normally holding their fingers at given angular positions with respect to the core to cause application of each material under a given tension at a given angular position on the core, variations in the tensions of the materials causing rocking movement of their respective units on the spindle, gear teeth on each finger support, and a ring gear rotatable with the spindle and interengaging the gear teeth of the finger supports to cause rocking movement thereof in their units when their units are rocked on the spindle by variation in the tensions in the materials from the given tension to vary the angles of application of materials to the core to cause uniform lay of the materials on the core.

4. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, means to normally hold the units in given relative positions on the spindle, fingers for the units disposed adjacent the path of the core to guide their respective materials to the core, supports for the guide fingers mounted for rocking movement in their units and normally holding their fingers at given angular positions with respect to the core to cause application of each material under a given tension at a given angular position on the core, variations in the tensions of the materials causing rocking movement of their respective units on the spindle, gear teeth on each finger support, a ring gear interengaging the gear teeth of the finger supports mounted for rotation with the spindle and for rocking movement relative thereto, and balancing means for the ring gear whereby the ring gear may be rocked relative to the spindle during the initial rotary movement of the spindle to rock the finger supports and their fingers to cushion the initial pull on each material and whereby the ring gear may be returned to its normal position and held thereby during further rotation of the spindle.

5. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, means to normally hold the units in given relative positions on the spindle, fingers for the units disposed adjacent the path of the core to guide their respective materials to the core, and means operatively connecting the units whereby rocking of one unit by variation in the tension of the material guided by its finger will cause equal movement of the other unit to equalize the tensions in the materials.

6. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, means to normally hold the units in given relative positions on the spindle, fingers for the units disposed adjacent the path of the core to guide their respective materials to the core, gear segments carried by the units, and a pinion operatively connecting the units through the gear segments whereby rocking of one unit by variation in the tension of the material guided by its finger will cause equal movement of the other unit to equalize the tensions in the materials.

7. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, means to normally hold the units in given relative positions on the spindle, fingers for the units disposed adjacent the path of the core to guide their respective materials to the core, means operatively connecting the units whereby rocking of one unit by variation in the tension of the material guided by its finger will cause equal movement of the other unit to equalize the tensions in the materials, and means to rock the finger supports when their units have been rocked on the spindle by variation in the tensions in the material from the given tension to vary the angles of application of the materials to the core to cause uniform lay of the materials on the core.

8. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, fingers for the units disposed adjacent the path of the core to guide their respective materials to the core, supports for the guide fingers mounted for rocking movement in their units and normally holding their fingers at given angular positions with respect to the core to cause application of each material under a given tension at a given angular position on the core, and balancing spring means connecting the units whereby a decrease in the tension in one material results in rocking movement of its respective unit causing like rocking movement of the other unit to reduce the tension in its material to equalize the tensions in the materials.

9. In a material serving apparatus rotatable about a core, advancing longitudinally at a given rate of speed, to wind materials simultaneously in superimposed spiral layers on the core, a rotatable hollow spindle through which the core travels, supports carried thereby for supplies of materials fed to the core, units mounted on the spindle for rotation therewith and for relative rocking motion thereon, fingers for the units disposed adjacent the path of the core to guide their respective materials to the core, means operatively connecting the units whereby rocking of one unit by variation in the tension of the material guided by its finger will cause equal movement of the other unit to equalize the tensions in the materials, fingers for the units disposed adjacent the path of the core to guide their respective materials to the core, supports for the guide fingers mounted for rocking movement in their units and normally holding their fingers at given angular positions with respect to the core to cause application of each material under a given tension at a given angular position on the core, means operatively connecting the units whereby rocking movement of one unit resulting from an increase in the tension in its material will result in a like rocking motion imparted to the other unit to increase the tension in its material to equalize the tensions in the materials.

10. In a serving apparatus for winding materials in superimposed spiral layers on a longitudinally advancing core, rockable planetary supparts normally in opposition with respect to the path of the core, fingers for guiding materials to the core eccentrically mounted on the supports at given angles to the core path, means for producing relative rotation of the apparatus and the core, means responsive to unbalances in the tensions of the materials guided by the fingers for rocking the supports about the core path to re-equalize the tensions and adjust the angles of the fingers to maintain uniformity in the lay of the materials on the core.

11. In a serving apparatus for winding materials in superimposed spiral layers on a longitudinally advancing core, planetary supports, with gear segments disposed closely adjacent their axes, normally in opposition with respect to the path of the core, fingers for guiding materials under tension to the core mounted with their centers disposed at the opposite sides of and farther from the axes of their supports than the gear segments to render the supports sensitive to and readily movable by variations in the tensions in the materials from a given tension, means for producing relative rotation of the apparatus and the core and a gear operatively engaging the gear segments whereby the supports with the fingers may be rocked by variations in tensions in the materials to adjust the angles of the fingers relative to the core to maintain uniformity in the lay of the material on the core.

YVES A. BOUGET.

No references cited.